United States Patent
Yamada

(10) Patent No.: US 9,560,278 B2
(45) Date of Patent: Jan. 31, 2017

(54) IMAGING DEVICE, IMAGING DEVICE DRIVE METHOD, AND IMAGING DEVICE CONTROL PROGRAM

(71) Applicant: FUJIFILM Corporation, Tokyo (JP)

(72) Inventor: Makoto Yamada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/885,344

(22) Filed: Oct. 16, 2015

(65) Prior Publication Data

US 2016/0044246 A1 Feb. 11, 2016

Related U.S. Application Data

(63) Continuation of application No. PCT/JP2014/059216, filed on Mar. 28, 2014.

(30) Foreign Application Priority Data

Apr. 17, 2013 (JP) .................................. 2013-086842

(51) Int. Cl.
*H04N 5/232* (2006.01)
*G03B 5/00* (2006.01)
*G03B 5/08* (2006.01)

(52) U.S. Cl.
CPC ............ *H04N 5/23287* (2013.01); *G03B 5/00* (2013.01); *G03B 5/08* (2013.01); *H04N 5/23212* (2013.01); *H04N 5/23258* (2013.01)

(58) Field of Classification Search
CPC ............ H04N 5/23287; H04N 5/23212; H04N 5/23258; H04N 5/2259; H04N 5/2356; H04N 5/23248; H04N 5/23254; H04N 5/23251; G03B 5/08; G03B 5/00; G03B 13/32; G03B 13/34; G03B 13/36; G03B 3/10; G03B 3/00; G03B 3/02; G03B 3/04; G03B 2205/0007; G03B 2205/0015; G02B 7/105; G02B 7/28; G02B 7/285; G02B 7/36; G02B 7/365; G06T 2207/10148; G06T 5/003; G06T 5/004; G08B 13/19602; G09G 2320/106
See application file for complete search history.

(56) References Cited

U.S. PATENT DOCUMENTS 7,474,352 B2 * 1/2009 Oikawa ............. H04N 5/23212
348/208.12
2006/0055788 A1 3/2006 Kawabe
(Continued)

FOREIGN PATENT DOCUMENTS

JP 2006-86586 A 6/2006
JP 2006-208932 A 8/2006
(Continued)

OTHER PUBLICATIONS

International Search Report for PCT/JP2014/059216 mailed on Jun. 24, 2014.
(Continued)

*Primary Examiner* — Aung S Moe
(74) *Attorney, Agent, or Firm* — Birch, Stewart, Kolasch & Birch, LLP

(57) ABSTRACT

An imaging device includes an imaging-lens, an image-sensor, a lens-moving-mechanism, a ROM, and an intersection-point-position-control-section. The lens-moving-mechanism moves an intersection point on the image-sensor by moving a second lens in a plane perpendicular to an optical axis. The ROM stores, in advance, a LUT that stores the intersection point and an image quality evaluation value of an image, which is obtained through image capturing performed at the intersection point, in association with each other. The intersection-point-position-control-section acquires the current intersection point, calculates distances between the current intersection point and the plurality of (Continued)

intersection points stored in the LUT, and selects an intersection point for imaging, at which a ratio of the image quality evaluation value to the distance from the current intersection point is at the maximum, among the positions of the plurality of intersection points stored in the LUT.

20 Claims, 13 Drawing Sheets

(56) References Cited

U.S. PATENT DOCUMENTS

| | | | |
|---|---|---|---|
| 2006/0087707 A1* | 4/2006 | Akaho | H04N 5/23248 358/518 |
| 2011/0285855 A1* | 11/2011 | Ota | G01S 3/7864 348/169 |
| 2012/0044369 A1 | 2/2012 | Irisawa et al. | |

FOREIGN PATENT DOCUMENTS

| | | |
|---|---|---|
| JP | 2010-237250 A | 10/2010 |
| JP | 2012-44498 A | 3/2012 |
| JP | 2012-222431 A | 11/2012 |

OTHER PUBLICATIONS

PCT/IPEA/416 & PCT/IPEA/409 for PCT/JP2014/059216 dated May 26, 2015.
Written Opinion of the International Searching Authority for PCT/JP2014/059216 mailed on Jun. 24, 2014.

* cited by examiner

FIG. 4

| FOCAL POSITION F1 ||
|---|---|
| OPTICAL AXIS POSITION | IMAGE QUALITY EVALUATION VALUE |
| $A_1$ | 1.0 |
| $A_2$ | 0.9 |
| $A_3$ | 0.8 |
| $A_4$ | 0.9 |
| $A_5$ | 0.8 |
| $A_6$ | 0.7 |
| $A_7$ | 0.8 |
| $A_8$ | 0.7 |
| $A_9$ | 0.6 |

FIG. 12

| FOCAL POSITION F1 | |
|---|---|
| OPTICAL AXIS POSITION | IMAGE QUALITY EVALUATION VALUE |
| $A_1$ | 1.0 |
| $A_2$ | 0.9 |
| $A_4$ | 0.9 |

IMAGING DEVICE, IMAGING DEVICE DRIVE METHOD, AND IMAGING DEVICE CONTROL PROGRAM

CROSS-REFERENCE TO RELATED APPLICATIONS

This application is a Continuation of PCT International Application No. PCT/JP2014/059216 filed on Mar. 28, 2014, which claims priority under 35 U.S.C §119(a) to Japanese Patent Application No. 2013-086842 filed on Apr. 17, 2013. Each of the above application(s) is hereby expressly incorporated by reference, in its entirety, into the present application.

BACKGROUND OF THE INVENTION

1. Field of the Invention

The present invention relates to an imaging device, an imaging device drive method, and a recording medium storing an imaging device control program. The imaging device is provided such that an imaging lens or an image sensor is relatively movable in a plane perpendicular to an optical axis of the imaging lens.

2. Description of the Related Art

Imaging devices such as camera modules mounted on digital cameras, video cameras, smartphones, and tablet terminals have spread. The imaging device includes: an imaging lens that forms an image of a subject; and an image sensor that captures the image of the subject, which is formed by the imaging lens, by performing photoelectric conversion for each pixel.

If an imaging device is manufactured, various manufacturing errors occur. For example, in the imaging lens, there are errors such as deviation in a position of a surface and a surface shape. If the imaging lens is formed of a plurality of lenses, there are assembly errors such as errors in positions, intervals, and tilts of the lenses. Further, there are also errors in determining positions of the imaging lens and the image sensor. As might be expected, it is considered that such various manufacturing errors are minimized. For example, if the plurality of lenses is constituted to form the imaging lens, by performing the assembly and regulation while photographing a test chart, the assembly errors are reduced (JP2006-208932A). In a manner similar to the above, errors in determining the positions of the imaging lens and the image sensor and the like are reduced.

In contrast, if various manufacturing errors are intended to be completely eliminated, a yield ratio deteriorates, and this leads to an increase in cost. Therefore, some manufacturing errors should be tolerated. However, if the above-mentioned various manufacturing errors cumulatively occur, this may seriously affect image quality of a photographed image. For example, there may be occurrence of low resolution at some locations on a photographed image or occurrence of distribution in resolution. For example, the distribution in resolution means that resolution is high on one side of a photographed image and resolution is low on the other side thereof.

Hence, recently, there is a known technology of correcting lowering in image quality of a photographed image, which is caused by cumulative manufacturing errors, at a photography step. For example, there is a known method of obtaining a photographed image with uniform resolution on the entire screen by automatically photographing a subject at a plurality of focal positions in response to a photography instruction and synthesizing high-resolution parts of the respective images through image processing (JP2012-222431A).

In an imaging device having a hand shaking correction function, image quality of a photographed image may be improved using a lens (hereinafter referred to as a correction lens) which is movable in a direction perpendicular to the optical axis in order to correct hand shaking. For example, there is a known imaging device that moves the correction lens on the basis of an optically optimal position of the correction lens when the optimal position is calculated in advance by photographing a test chart so as to perform hand shaking correction and that makes the correction lens stationary at the optimal position when hand shaking correction is not performed (JP2006-086586A). There is also an imaging device that corrects lateral chromatic aberration through a correction lens (JP2012-044498A). Further, there is also a known imaging device that improves image quality of a photographed image by moving an eccentric lens group which is movable in a direction perpendicular to the optical axis in a manner similar to that of the correction lens (JP2010-237250A).

SUMMARY OF THE INVENTION

In order to improve image quality of a photographed image and compensate for image quality lowered by cumulative manufacturing errors, an intersection point between the optical axis and an image sensor may be moved. In this case, it is necessary to move the intersection point between the optical axis and the image sensor as fast as possible. For example, as disclosed in JP2006-086586A, even when the optically optimal position of the correction lens is determined, if the correction lens is moved to a position far from the optimal position in order to correct hand shaking at a time point at which the photography instruction is input, photography is performed after the correction lens moves to the optimal position. This may cause missing a photo opportunity.

Nonetheless, since a movement speed of the correction lens is limited, it is not realistic to simply move the correction lens at a high speed. Further, if the hand shaking correction function is turned off and the correction lens keeps being held at a position constantly optimal for photography, even though the photography instruction is input at any time, it is possible to improve image quality of the photographed image, and it is possible to compensate for lowering in image quality caused by manufacturing errors. However, if hand shaking occurs, it is difficult to check a live-view image. Therefore, primarily, it is difficult to take the photo opportunity.

The present invention has an object to provide an imaging device, a driving method therefor, and a recording medium storing a control program therefor. The imaging device is capable of making image quality of the photographed image as good as possible within an area of movement of the intersection point, which can be moved fast without missing the photo opportunity by moving the correction lens or the image sensor, between the optical axis and the image sensor, and is capable of compensating for the lowering in image quality caused by manufacturing errors.

An imaging device of the present invention includes: an imaging lens that forms an image of a subject; an image sensor that captures the image of the subject; a moving mechanism; a memory; and an intersection point position control section. The moving mechanism moves a position of an intersection point between the image sensor and an optical axis of the imaging lens by moving at least either one of the image sensor or a lens included in the imaging lens in a plane which is perpendicular to the optical axis. The memory stores, in advance, image quality evaluation values respectively corresponding to positions of a plurality of the intersection points. The intersection point position control section acquires a position of the current intersection point, calculates distances between the position of the current intersection point and the positions of the plurality of the intersection points stored in the memory, and selects the position of the intersection point, at which a ratio of the image quality evaluation value to the distance from the position of the current intersection point is at the maximum, as a position of an intersection point for imaging, among the positions of the plurality of the intersection points stored in the memory. The moving mechanism moves a position of the current intersection point to the position of the intersection point for imaging.

It is preferable that the image quality evaluation value is a value based on a sharpness degree of the image. The image quality evaluation value may be a value based on an average luminance of the image and the sharpness degree of the image.

It is preferable that the memory stores only the image quality evaluation values and the positions of the intersection points, at which the image quality evaluation values are higher than a predetermined image quality evaluation value, among the plurality of the image quality evaluation values which are respectively measured at the positions of the plurality of the intersection points.

It is preferable that the imaging device further includes: a focus adjustment mechanism that moves a focal position of the imaging lens by moving the lens included in the imaging lens along the optical axis so as to perform focusing; and a focal position control section that controls the focal position through the focus adjustment mechanism. It is preferable that the memory stores the image quality evaluation value for each focal position in advance. It is preferable that the intersection point position control section selects the position of the intersection point for imaging with reference to the image quality evaluation value corresponding to the focal position determined by the focal position control section.

The image sensor captures an image of the subject at a shutter speed which is preset in accordance with the subject. The intersection point position control section acquires the shutter speed which is preset in accordance with the subject, and compares the shutter speed with a predetermined shutter speed as a threshold value. The intersection point position control section moves the position of the current intersection point to the position of the intersection point for imaging if the set shutter speed is equal to or less than the predetermined shutter speed. Assuming that a 35 mm equivalent focal length of the imaging lens is f (mm), the predetermined shutter speed is equal to or less than 1/f seconds.

It is preferable that the imaging device further includes a hand shaking detection section that detects hand shaking, in which if the shutter speed preset in accordance with subject is slower than the predetermined shutter speed, the intersection point position control section corrects the hand shaking by moving the position of the intersection point in accordance with the hand shaking.

It is preferable that the imaging device further includes a subject movement detection section that detects movement of the subject, in which if the shutter speed preset in accordance with subject is slower than the predetermined shutter speed, the intersection point position control section controls the position of the intersection point so as to cancel the movement of the subject.

For example, the image quality evaluation values are calculated on the basis of resolutions of test chart images which are obtained by capturing images of a test chart while changing the position of the intersection point between the optical axis and the image sensor.

A method of driving an imaging device of the present invention is a method of driving the imaging device provided such that at least either one of an image sensor capturing an image of a subject or a lens included in an imaging lens forming an image of the subject is movable in a plane which is perpendicular to the optical axis of the imaging lens. The method includes an intersection point acquisition step, an intersection-point-for-imaging selection step, an intersection point movement step, and an imaging step. In the intersection point acquisition step, a position of a current intersection point between the image sensor and the optical axis is acquired. In the intersection-point-for-imaging selection step, referring to the memory in which image quality evaluation values respectively corresponding to positions of a plurality of the intersection points are stored in advance, distances between the position of the current intersection point and the positions of the intersection points stored in the memory are calculated, and a position of an intersection point for imaging, at which a ratio of the image quality evaluation value to the distance from the position of the current intersection point is at the maximum, is selected. In the intersection point movement step, the position of the current intersection point is moved to the position of the intersection point for imaging. In the imaging step, an image of the subject is captured in a state where the intersection point between the optical axis and the image sensor is set at the position of the intersection point for photography.

A recording medium storing a computer readable non-transitory program for controlling an imaging device of the present invention is a recording medium storing a program for controlling an imaging device including an imaging lens that forms an image of a subject, an image sensor that captures the image of the subject, a moving mechanism that moves a position of an intersection point between the image sensor and an optical axis of the imaging lens by moving at least either one of the image sensor or a lens included in the imaging lens in a plane which is perpendicular to the optical axis, and a memory that stores, in advance, image quality evaluation values respectively corresponding to positions of a plurality of the different intersection points. The program causes the imaging device to execute: an intersection point acquisition step of acquiring the current intersection point; an intersection-point-for-imaging selection step of referring to the memory, calculating distances between the position of the current intersection point and the positions of the intersection points stored in the memory, and selecting a position of an intersection point for imaging, at which a ratio of the image quality evaluation value to the distance from the current intersection point is at the maximum; an intersection point movement step of causing the moving mechanism to move the current intersection point to the position of the intersection point for imaging; and an imaging step of causing the image sensor to capture an image of the subject in a state where the position of the intersection point is set at the position of the intersection point for photography.

In the imaging device of the present invention, the position of the intersection point between the optical axis and the image sensor is movable, and positions of a plurality of the different intersection points and image quality evaluation values are associated and stored in advance. The image quality evaluation values are obtained by evaluating degrees of image quality of photographed images which are photographed at the positions of the intersection point. Then, among the plurality of intersection points stored in advance, the intersection point for imaging, at which a ratio of the image quality evaluation value to the distance from the current intersection point is at the maximum, is selected, the intersection point between the optical axis and the image sensor is moved to the position of the selected intersection point for imaging, and photography is performed. Hence, it is possible to make image quality of the photographed image as good as possible within an area of movement of the intersection point, which can be moved fast without missing the photo opportunity, on the image sensor, and it is possible to compensate for the lowering in image quality caused by manufacturing errors.

BRIEF DESCRIPTION OF THE DRAWINGS

FIG. 4 is an explanatory diagram of a LUT.

FIG. 12 is a LUT in which only data having image quality evaluation values within 10% of the maximum value is registered.

DESCRIPTION OF THE PREFERRED EMBODIMENTS

Figure 1:
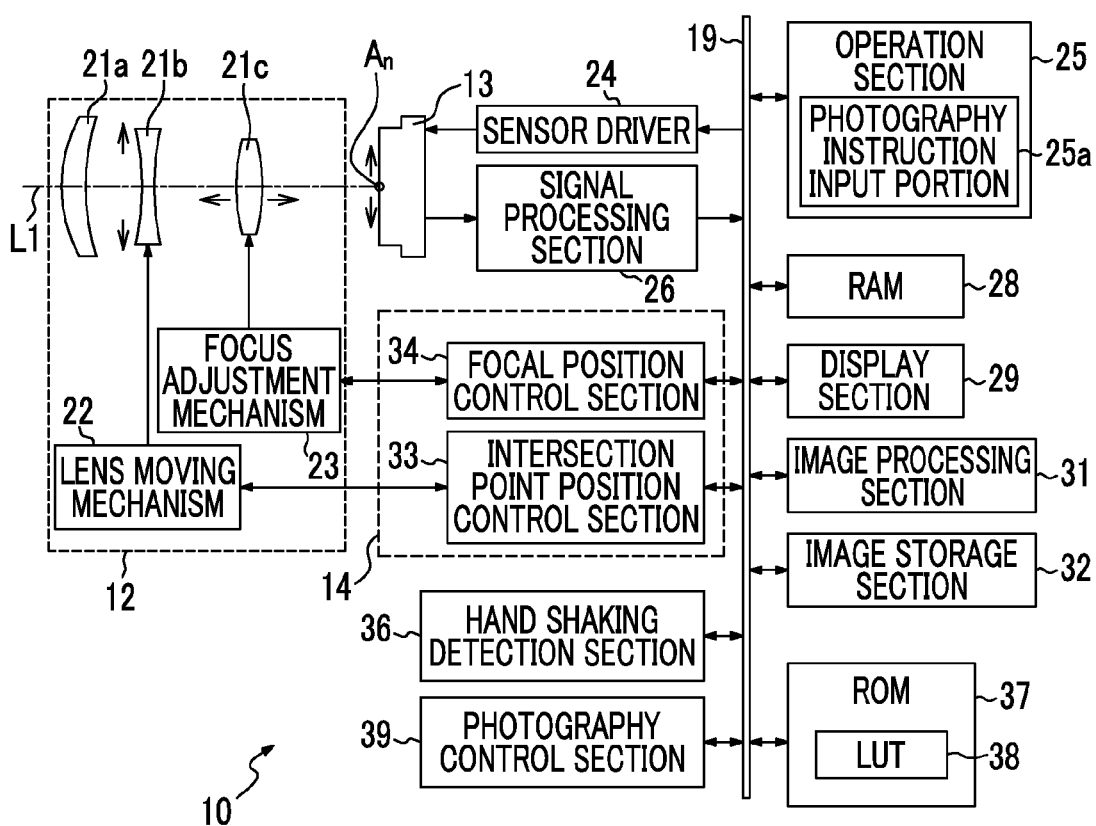
FIG. 1 is a block diagram illustrating a configuration of an imaging device.

As shown in FIG. 1, an imaging device 10 includes an imaging lens 12, an image sensor 13, a lens control unit 14, a hand shaking detection section 36, a photography control section 39, and the like. The respective sections of the imaging device 10 are connected to each other through a bus 19.

The imaging lens 12 includes, for example, three lenses of first to third lenses 21a to 21c, a lens moving mechanism 22, and a focus adjustment mechanism 23, and forms an image of a subject on the image sensor 13 through the first to third lenses 21a to 21c. In addition, the imaging lens 12 may include an aperture stop (not shown) for adjusting an amount of exposure.

In the first to third lenses 21a to 21c, the second lens 21b is a correction lens, and is supported by the lens moving mechanism 22 so as to be movable in a direction perpendicular to an optical axis L1. The optical axis L1 is bent in the middle thereof through movement of the second lens 21b, thereby changing a position of an intersection point $A_n$ between the optical axis L1 and the image sensor 13, on the image sensor 13. The second lens 21b is moved for, for example, hand shaking correction or the like. The lens moving mechanism 22 is a so-called hand shaking correction mechanism, but moves the intersection point $A_n$ in order to improve image quality of a photographed image even when not performing hand shaking correction.

The third lens 21c is supported by the focus adjustment mechanism 23 so as to be movable along the optical axis L1. The third lens 21c is a so-called focusing lens for adjusting focus, and is movable in three stages in accordance with a distance (photography distance) to a subject. Thereby, a focal position of imaging lens 12 can be adjusted in three stages of F1, F2, and F3.

The image sensor 13 captures an image of the subject which is formed by the imaging lens 12, and outputs an image signal. The image sensor 13 is, for example, a CMOS, but may be a CCD. An operation of the image sensor 13 is controlled with the aid of a sensor driver 24. The sensor driver 24 captures the image of the subject, for example, at a shutter speed (exposure time) which is designated by a user. The shutter speed is set through an operation of an operation section 25. Further, the sensor driver 24 sequentially outputs an image signal for live view display from the image sensor 13 at a predetermined frame rate. If a photography instruction is input through the operation of a photography instruction input portion 25a of the operation section 25, the sensor driver 24 causes the image sensor 13 to capture an image of the subject, and outputs an image signal for a still image. The image signal, which is output by the image sensor 13, is input to a signal processing section 26.

The signal processing section 26 is an image engine that generates image data (photographed images and images for live view display) by applying various kinds of signal processing such as demosaic processing to the image signal which is output by the image sensor 13. The generated photographed image is temporarily stored in a RAM 28. If the photographed image is based on the image signal which is automatically output at a predetermined frame rate regardless of the input of the photography instruction, for example, the image is displayed as a live view image on a display section 29. Further, if the generated photographed image is based on the image signal which is output in response to the input of the photography instruction, an image processing section 31 performs various kinds of image processing such as γ correction processing and grayscale conversion processing on the image, and thereafter the image is stored in an image storage section 32.

Depending on settings, the signal processing section 26 detects optimal white balance on the basis of the input image signal, and automatically adjusts the white balance of the generated photographed image or the image for live view display. Further, the signal processing section 26 calculates a focus evaluation value by using the input image signal. The calculated focus evaluation value is used in calculation of a position to which the third lens 21c will be moved.

The lens control unit 14 includes an intersection point position control section 33 and a focal position control section 34, and causes the control sections to control the positions of the second lens 21b and the third lens 21c.

Further, if the imaging lens 12 includes an aperture stop, the lens control unit 14 adjusts an aperture ratio of the aperture stop.

The intersection point position control section 33 controls a position of an intersection point between the optical axis L1 and the image sensor 13 (hereinafter simply referred to as an intersection point) by moving the second lens 21b in a direction perpendicular to the optical axis L1 through the lens moving mechanism 22. A method of determining the position, to which the second lens 21b is moved by the intersection point position control section 33, is different in accordance with the shutter speed. Specifically, the intersection point position control section 33 acquires the shutter speed which is preset by a user in accordance with a subject, and compares the shutter speed with a predetermined shutter speed as a threshold value. If the set shutter speed is slower than the predetermined shutter speed and hand shaking occurs, the intersection point position control section 33 performs hand shaking correction.

If the hand shaking correction is performed, the intersection point position control section 33 determines the position, to which the second lens 21b will be moved, on the basis of a posture signal, and thereby sequentially continuously moves the second lens 21b in a direction to cancel hand shaking. The posture signal is acquired from the hand shaking detection section 36. The hand shaking detection section 36 has, for example, an angular velocity sensor, an acceleration sensor, or both of the sensors so as to detect rotation (an angular velocity) or parallel shift (an acceleration), and outputs the posture signal which indicates change in posture of the imaging device 10.

In contrast, if the shutter speed is equal to or less than the predetermined shutter speed and the shutter speed is fast to such an extent that hand shaking scarcely occurs, the photography instruction may be input. In this case, the intersection point position control section 33 moves the position of the intersection point $A_n$ to a position of an intersection point for photography to improve image quality of the photographed image, and makes the position of the intersection point $A_n$ stationary at the position of the intersection point for photography. In this state, photography is performed. The position of the intersection point for photography is determined on the basis of the position of the current intersection point $A_n$ and data of a look-up table (LUT) 38. The intersection point position control section 33 acquires the current position of the second lens 21b from the lens moving mechanism 22, and calculates the position of the current intersection point $A_n$ on the basis of the current position of the second lens 21b. Further, the intersection point position control section 33 acquires the LUT 38 from the ROM 37. The LUT 38 is a data table in which a plurality of intersection points is associated with image quality evaluation values of photographed images (for example sharpness degrees, resolutions, luminances, or values of combination of those) which are photographed at respective intersection points, and is stored in the ROM 37 in advance. In addition, the intersection point position control section 33 does not arbitrarily determine the position of the intersection point for photography in the entire area of movement of the intersection point, but selects the position of the intersection point for photography among the plurality of intersection points stored in the LUT 38. Therefore, points, which are candidates of the position of the intersection point for photography, are discrete.

Assuming that a 35 mm equivalent focal length of the imaging lens 12 is f (mm), the predetermined shutter speed, which is compared with the shutter speed by the intersection point position control section 33, is equal to or less than 1/f seconds. A value of 1/f seconds is a reference as to whether or not hand shaking is negligible. If the shutter speed for photography that is set by a user is slower than 1/f seconds, hand shaking may occur. In this case, image blurring, which is caused by hand shaking to such an extent that at least blurring is remarkable, occurs in the photographed image. In contrast, the shutter speed for photography which is set by a user may be fast to be equal to or less than 1/f seconds. In this case, even when hand shaking occurs, image blurring caused by hand shaking is unlikely to occur in the photographed image. In addition, even though there is blurring when the photographed image is deeply observed, it can be said that there is almost no image blurring caused by hand shaking.

The focal position control section 34 controls the focal position of the imaging lens 12 by moving the third lens 21c along the optical axis L1 through the focus adjustment mechanism 23. Specifically, the focal position control section 34 automatically adjusts focus by moving the third lens 21c to any of the focal positions F1, F2, and F3, on the basis of the focus evaluation value which is input from the signal processing section 26.

The photography control section 39 integrally controls operations of the respective sections of the imaging device 10 such as the lens control unit 14, the sensor driver 24, the signal processing section 26, and the image processing section 31. The photography control section 39 is, for example, a CPU, and controls the operations of the respective sections of the imaging device 10 through control programs (not shown) which are stored in the ROM 37 in advance, as described above. The intersection point position control section 33 and the focal position control section 34 of the lens control unit 14 and the sensor driver 24 are some of the control programs executed by the photography control section 39.

Figure 2:
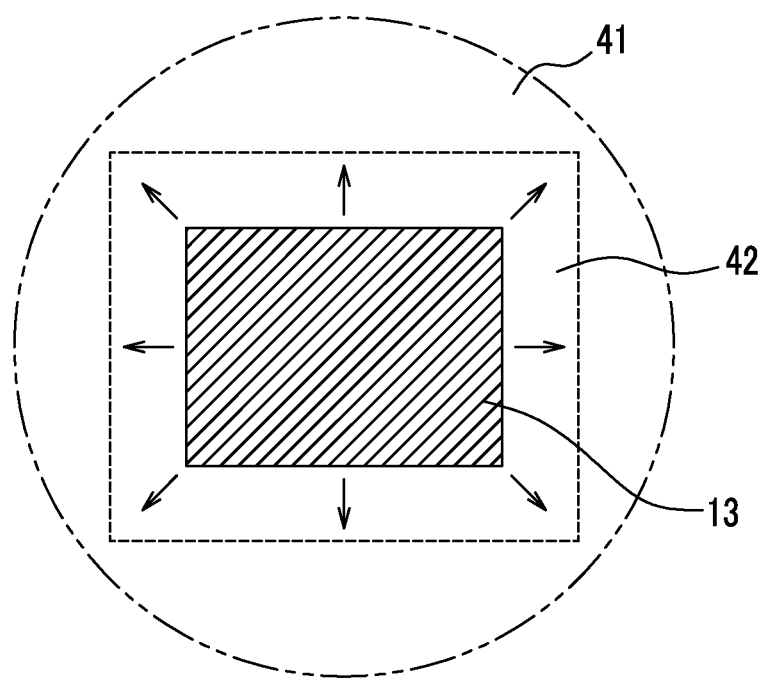
FIG. 2 is an explanatory diagram illustrating an area of movement of an image sensor which is moved by moving a correction lens.
Figure 3:
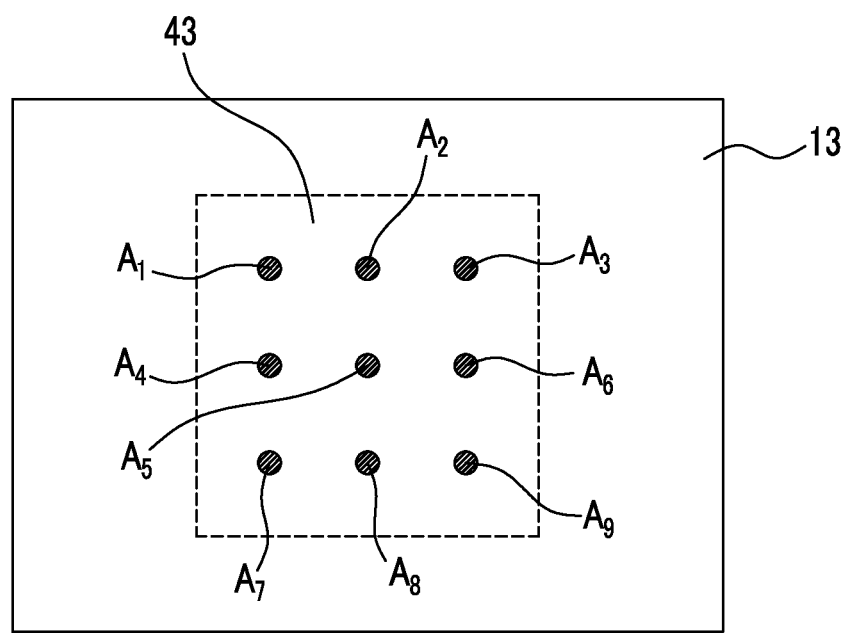
FIG. 3 is an explanatory diagram illustrating a movable area of an intersection point and intersection points at which image quality evaluation values are stored.

As shown in FIG. 2, a movable area of the image sensor 13 within an image circle 41 of the imaging lens 12 is, for example, a rectangular area 42. Hence, as shown in FIG. 3, a movable area of the position of the intersection point $A_n$ on the image sensor 13 is a square area (hereinafter referred to as a movable area of the intersection point) 43 indicated by the dashed line. The lens moving mechanism 22 restricts a movable area of the second lens 21b such that the intersection point between the optical axis L1 and the image sensor 13 moves only inside the movable area 43 of the intersection point. In addition, the intersection point $A_5$ is a point at the center of the movable area 43, and the other intersection points $A_1$ to $A_4$ and $A_6$ to $A_9$ are points in the middle between the central intersection point $A_5$ and the respective sides and the respective vertexes of the movable area 43.

Figure 4:
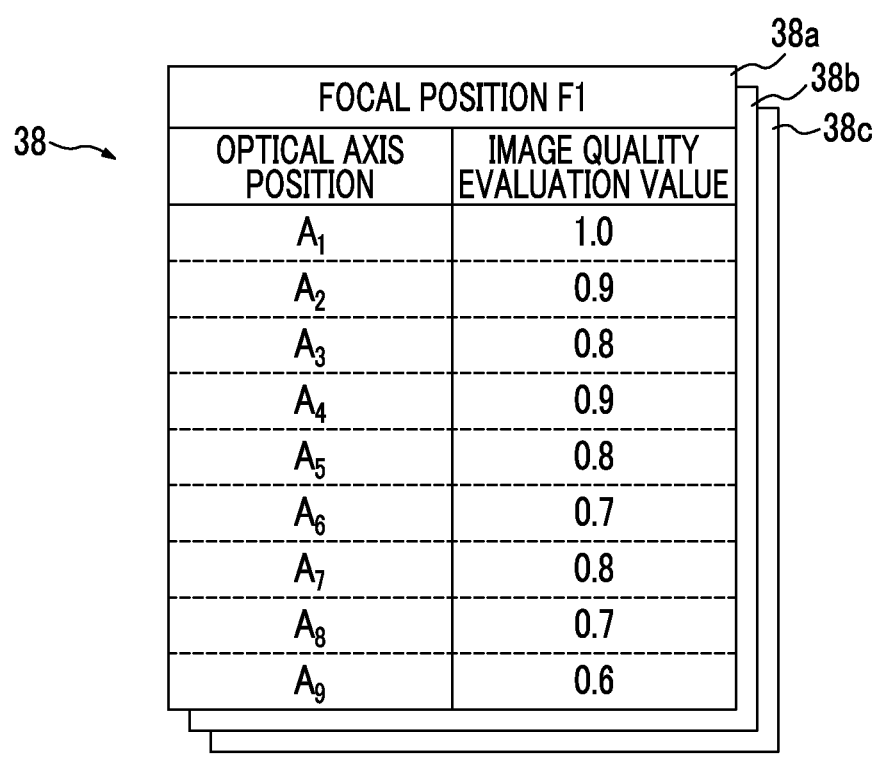

As shown in FIG. 4, the LUT 38 stores the above-mentioned 9 intersection points $A_1$ to $A_9$ in the movable area 43 of the intersection point in a state where the respective intersection points $A_1$ to $A_9$ are associated with image quality evaluation values. Further, the LUT 38 stores image quality evaluation values in association with the respective intersection points $A_1$ to $A_9$ in accordance with the focal positions F1, F2, and F3. That is, the LUT 38 is formed of three types of table of a first LUT 38a, a second LUT 38b, and a third LUT 38c. In the first LUT 38a, image quality evaluation values are associated with the respective intersection points $A_1$ to $A_9$ in the case of the focal position F1. In the second LUT 38b, image quality evaluation values are associated with the respective intersection points $A_1$ to $A_9$ in the case of the focal position F2. In the third LUT 38c, image quality evaluation values are associated with the respective intersection points $A_1$ to $A_9$ in the case of the focal position F3.

The LUT 38 stores the respective image quality evaluation values of the respective intersection points $A_1$ to $A_9$ in a state where the values are normalized by a maximum value thereof. Hence, a maximum value of the image quality evaluation value is "1.0", and a minimum value thereof is "0.0". For example, in FIG. 4, in the case of the focal position F1, the image quality evaluation value of the intersection point $A_1$ is the maximum value.

Figure 5:
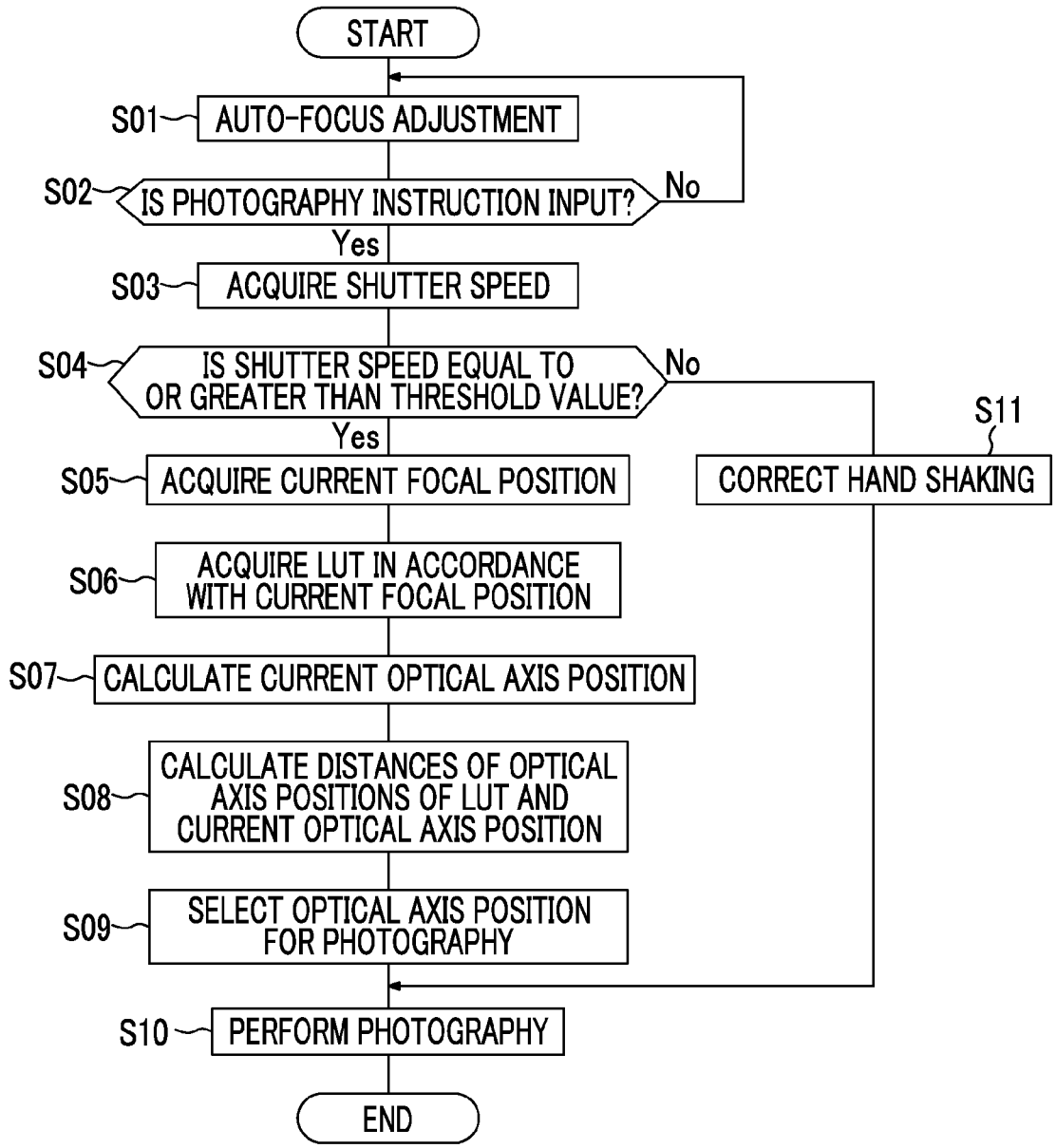
FIG. 5 is a flowchart illustrating operations of the imaging device.

Hereinafter, operations of the imaging device 10 will be described. As shown in FIG. 5, if power of the imaging device 10 is turned on, the image sensor 13 outputs the signal of the image for live view display, and the signal processing section 26 calculates the focus evaluation value. The focal position control section 34 automatically adjusts focus by moving the third lens 21c to any of the focal positions F1, F2, and F3, on the basis of the focus evaluation value (S01). The auto-focus adjustment is appropriately repeated until the photography instruction is input from the photography instruction input portion 25a (S02). Hence, the live-view image, which is displayed on the display section 29, is an image in which a subject is constantly in focus. In such a manner, while the auto-focus adjustment is repeatedly performed, the hand shaking correction function is in an on-state, and the intersection point position control section 33 continuously performs hand shaking correction by moving the second lens 21b on the basis of the posture signal which is sent from the hand shaking detection section 36.

If the photography instruction is input from the photography instruction input portion 25a (S02; Yes), the intersection point position control section 33 first acquires the set shutter speed (S03), and compares the speed with a predetermined shutter speed (S04).

If the set shutter speed is slower than the predetermined shutter speed (S04; No), while the intersection point position control section 33 performs hand shaking correction (S11), photography is performed (S10).

In contrast, if the shutter speed is equal to or smaller than the predetermined shutter speed and the shutter speed is fast (S04; Yes), the intersection point position control section 33 acquires a current focal position from the focal position control section 34 (S05). Then, referring to the ROM 37, the intersection point position control section 33 acquires any of the first to third LUTs 38a to 38c in accordance with the current focal position (S06). In the present example, the focal position is F1, and the first LUT 38a is acquired. Further, the intersection point position control section 33 acquires a current position of the second lens 21b from the lens moving mechanism 22, and calculates a position of the current intersection point $N_0$ (S07).

Figure 6:
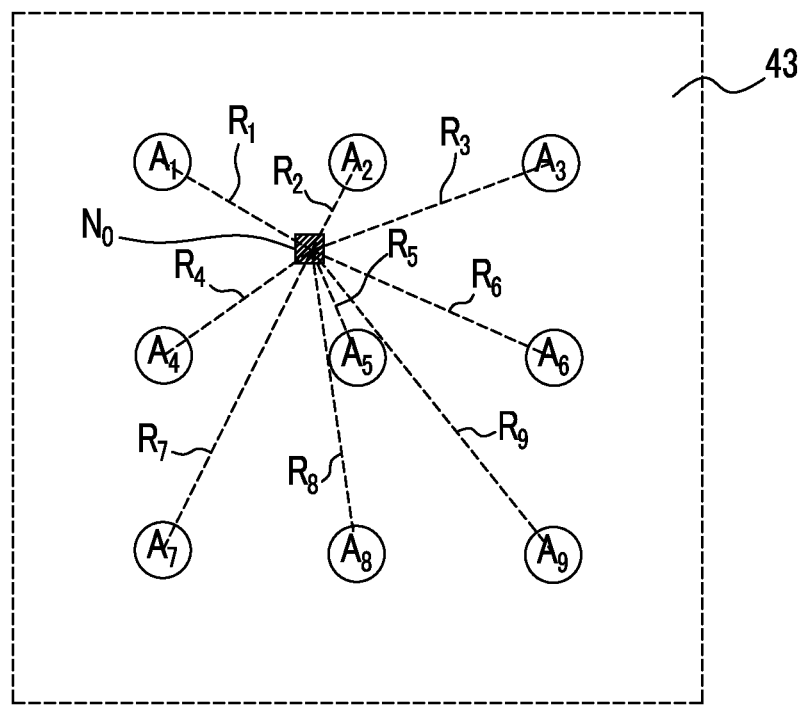
FIG. 6 is an explanatory diagram illustrating a method of selecting a position of an intersection point for photography.

As shown in FIG. 6, the intersection point position control section 33 respectively calculates distances $R_1$ to $R_9$ from the position of the current intersection point $N_0$ to the positions of the respective intersection points $A_1$ to $A_9$ in the first LUT 38a (S08).

Subsequently, by using the calculated distances $R_1$ to $R_9$ and image quality evaluation values which are associated with the respective intersection points $A_1$ to $A_9$ in the first LUT 38a, the intersection point position control section 33 calculates proportions $P_1$ to $P_9$ of image quality evaluation values to the distances $R_1$ to $R_9$. Specifically, the proportion $P_1$ is $1.0/R_1$, the proportion $P_2$ is $0.9/R_2$, the proportion $P_3$ is $0.8/R_3$, and so on. Then, by comparing the proportions $P_1$ to $P_9$, a position of the intersection point having the maximum value of the proportion is selected as the position of the intersection point for photography (S09). In the present example, it is assumed that the proportion $P_2$ of $0.9/R_2$ is at the maximum. Hence, the intersection point position control section 33 selects the position of the intersection point $A_2$ as the position of the intersection point for photography among the intersection points $A_1$ to $A_9$ which are registered in the first LUT 38a. Then, the intersection point position control section 33 moves the second lens 21b through the lens moving mechanism 22 such that the position of the intersection point for photography ($A_2$) moves from the current intersection point $N_0$.

If the current intersection point reaches the position of the intersection point for photography ($A_2$), the intersection point position control section 33 inputs a photography permission signal, which is for permitting photography, to the sensor driver 24. When receiving the input of the signal for permitting photography, the sensor driver 24 causes the image sensor 13 to capture an image of a subject and to output an image signal thereof (S10).

As described above, the imaging device 10 compares the proportions $P_1$ to $P_9$, selects the intersection point having the maximum value of the proportion as the position of the intersection point for photography, moves the intersection point between the optical axis L1 and the image sensor 13 to the selected position of the intersection point for photography, and performs photography. That is, among the intersection points $A_1$ to $A_9$ registered in the LUT 38 in advance, the intersection point, which is close to the intersection point $N_0$ at the time point of the input of the photography instruction and has a large image quality evaluation value, is selected, and photography is performed.

For example, even though there is the intersection point having a high image quality evaluation value at a position far from the intersection point $N_0$ at the time point of the input of the photography instruction, the position of the intersection point is not selected as the position of the intersection point for photography. Further, even though there is the intersection point which is close to the intersection point $N_0$ at the time point of the input of the photography instruction and is registered in the LUT 38, if the image quality evaluation value is low, the position of the intersection point is not selected as the position of the intersection point for photography.

Accordingly, the imaging device 10 selects the position of the intersection point, which has the maximum proportion of the proportions $P_1$ to $P_9$, as the position of the intersection point for photography, and is thereby able to select an optimal position of the intersection point for photography in consideration of both the image quality and the movement time period of the position of the intersection point between the optical axis L1 and the image sensor 13. Further, even when the image quality evaluation value is high, the intersection point at a position far from the intersection point $N_0$ at the time point of the input of the photography instruction is unlikely to be selected as the position of the intersection point for photography. As a result, the imaging device 10 is unlikely to miss the photo opportunity as compared with the imaging devices used in the related art.

Figure 7:
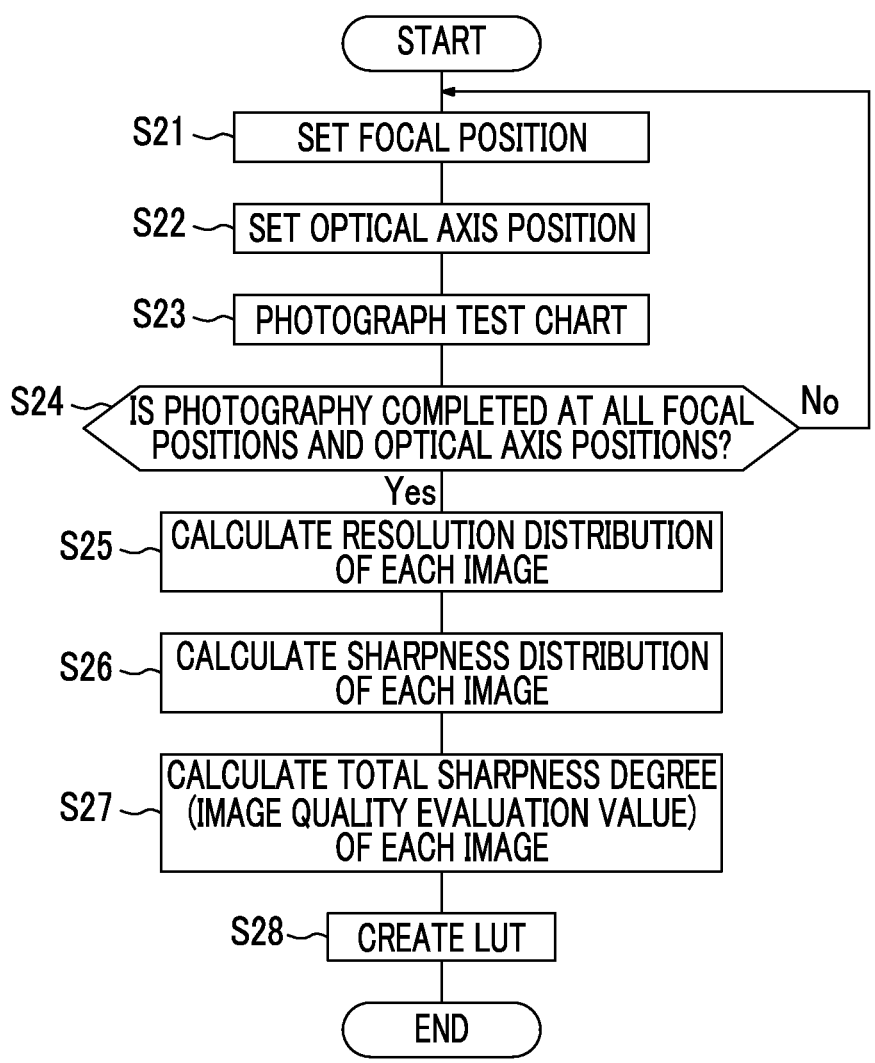
FIG. 7 is a flowchart illustrating a procedure of calculating the image quality evaluation values.

The image quality evaluation value is calculated in advance by causing the imaging device 10 to photograph a test chart while moving the intersection point $A_n$. For example, as shown in FIG. 7, first, a focal position of the imaging device 10 is set at any of the focal positions F1, F2, and F3 (S21). Subsequently, the intersection point is set as any of the intersection points $A_1$ to $A_9$ stored in the LUT 38 (S22), and the test chart is photographed (S23). The test chart is photographed at all combinations of the focal positions F1, F2, and F3 and the intersection points $A_1$ to $A_9$ (S24).

Figure 8:
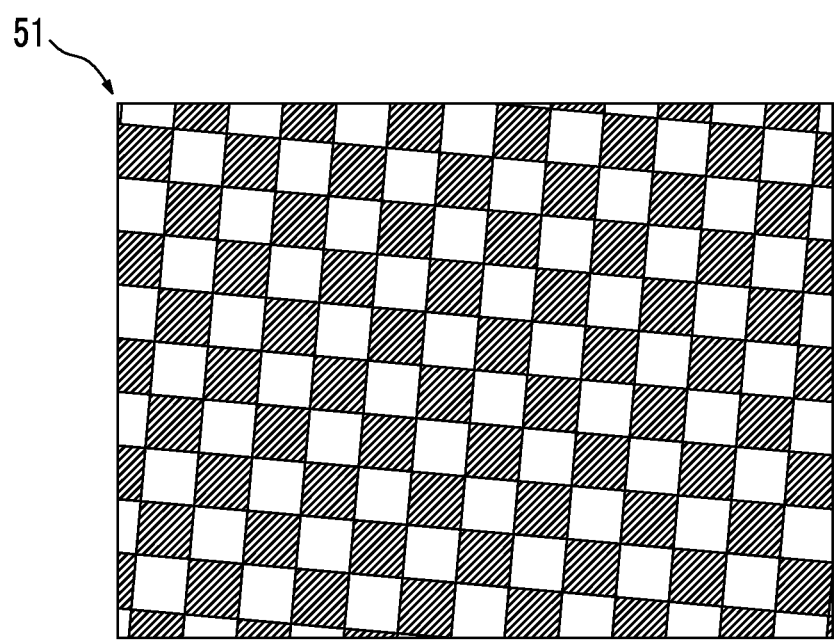
FIG. 8 is an explanatory diagram illustrating a test chart used to calculate the image quality evaluation values.
Figure 9:
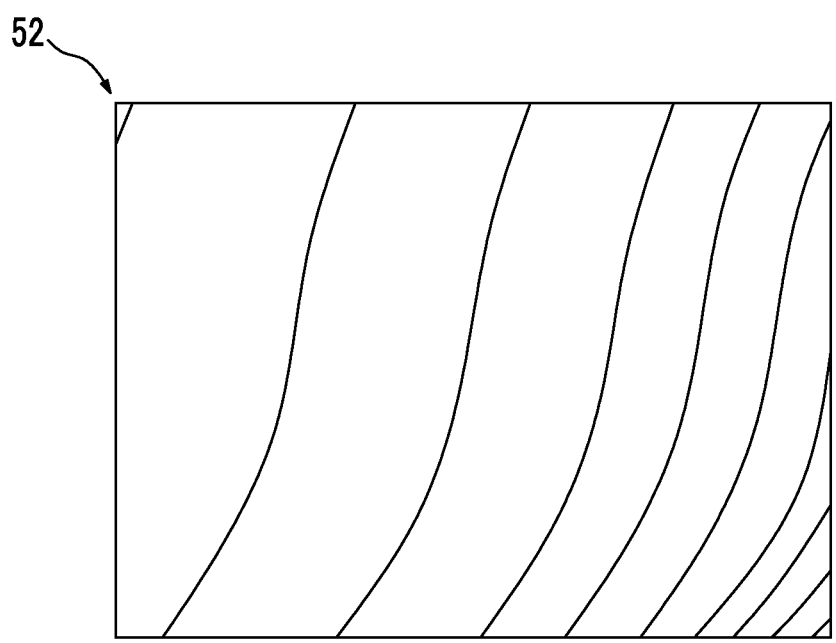
FIG. 9 is an explanatory diagram illustrating resolution distribution calculated from a test chart image.

In such a manner, resolution distribution of each of all the 27 test chart images, which are photographed at the intersection points $A_1$ to $A_9$ of the focal positions F1, F2, and F3, is calculated (S25). Hence, in the test chart photographed in steps S23 and S24, for example, at the positions in the whole areas of the photographed test chart images, resolutions (a spatial frequency response (SFR), a modulation transfer function (MTF), a contrast transfer function (CTF), and the like) may be calculated, and may be arbitrarily combined. For example, as shown in FIG. 8, a test chart 51, which is a black and white checkerboard pattern rotated by a few degrees, is appropriate. In the case of using the test chart 51, it is possible to calculate SFRs in a method described in ISO12233. The resolution distribution is data in which the resolutions calculated at the respective positions in the test chart image are mapped in association with the positions in the test chart image. A resolution distribution image is, for example as shown in FIG. 9, an image 52 which has a size the same as the test chart image and to which resolutions calculated by pixel values are assigned.

In such a manner, when the resolution distribution image 52 of the test chart image is calculated, sharpness distribution is calculated on the basis of the resolution distribution image 52 (S26). The sharpness degree is one of indicators of image quality, and is a resolution to which a spatial frequency response of vision is added. The sharpness degree can be calculated by integrating the spatial frequency response of vision and the resolution distribution image 52, for example, as described in "the journal of the Institute of Television Engineers of Japan 33 (12), 1000-1008". The sharpness distribution is data in which the sharpness degrees calculated at the respective positions of the resolution distribution image 52 (test chart image) are mapped in association with the positions in the resolution distribution image 52 (test chart image). Similarly to the resolution distribution image 52, the sharpness distribution image is, for example, an image which has a size the same as the test chart image and to which sharpness degrees calculated by pixel values are assigned.

Next, a total sharpness degree is calculated using the sharpness distribution image, and the total sharpness degree is set as the image quality evaluation value (S27). The total sharpness degree is an average value of pixel values of the sharpness distribution image. The total sharpness degree may be a value which is obtained by weighting and averaging the pixel values of the sharpness distribution image. If weighting is performed, for example, it is preferable that the weighting is performed such that the weight is smaller at a position further from the center of the sharpness distribution image. The reason for this is that, since main subjects are highly likely to be photographed in the center of the image, a sharpness degree at the center is more important for image quality evaluation than a sharpness degree at the periphery. For example, a total sharpness degree calculated from the test chart image photographed at the intersection point $A_1$ is associated as the image quality evaluation value of the intersection point $A_1$, whereby the LUT 38 is created (S28), and is stored in the ROM 37. In FIGS. 5 and 7, the intersection point is represented as an optical axis.

Figure 10:
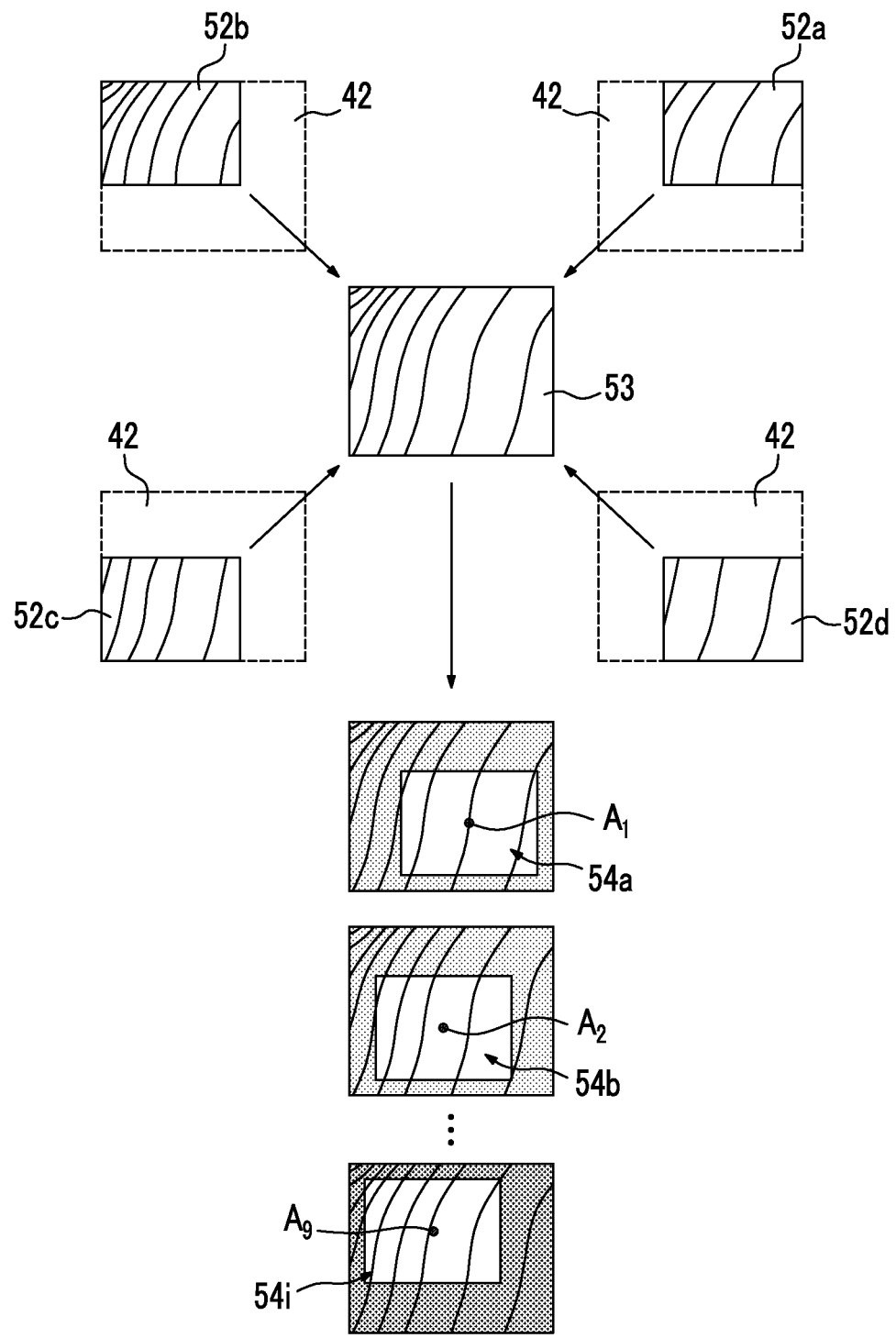
FIG. 10 is an explanatory diagram illustrating another method of calculating the image quality evaluation values.

The test chart 51 is photographed at each of all the intersection points $A_1$ to $A_9$ stored in the LUT 38. However, only by photographing the test chart four times, it is possible to calculate the above-mentioned image quality evaluation value. For example, as shown in FIG. 10, first, the image sensor 13 is moved to correspond to each of four upper right, upper left, lower right, and lower left locations of the rectangular area 42 in which the image sensor 13 is movable within the image circle 41, and the test chart is photographed. Thereby, resolution distribution images 52a to 52d are respectively generated. The respective resolution distribution images 52a to 52d are partially superimposed and synthesized to be matched with the area 42, thereby generating a resolution distribution image (hereinafter referred to as an entire-area resolution image) 53 of the entire area 42. Thereafter, an area 54a corresponding to the intersection point $A_1$, an area 54b corresponding to the intersection point $A_2$, . . . , and an area 54i corresponding to the intersection point A9 are cut out from the entire-area resolution distribution image 53, and then the test chart 51 is photographed at each of the intersection points $A_1$ to $A_9$. Thereby, it is possible to obtain resolution distribution images which are the same as the resolution distribution images which are separately generated. In the same manner as described above, the next sharpness distribution image is generated, and the image quality evaluation value thereof is calculated.

Figure 11:
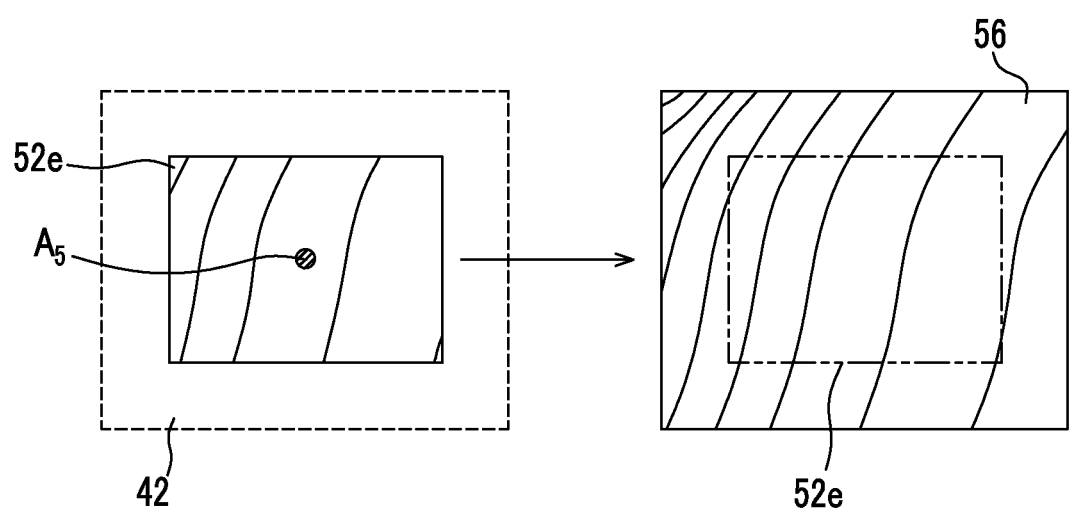
FIG. 11 is an explanatory diagram illustrating still another method of calculating the image quality evaluation values.

Further, the number of shots of the photography of the test chart for calculating the image quality evaluation values at each focal position may be reduced to one. For example, as shown in FIG. 11, first, the image sensor 13 is disposed at the center of the rectangular area 42 in which the image sensor 13 is movable within the image circle 41, and the test chart 51 is photographed, whereby a resolution distribution image 52e is generated. That is, by photographing the test chart 51 at the intersection point $A_5$, the resolution distribution image 52e is generated. By extrapolating this resolution distribution image 52e to the outer periphery of the area 42, an entire-area resolution distribution image 56 of the area 42 is generated. For example, by continuously applying a function for interpolating data within the resolution distribution image 52e to the area 42, resolution distribution within the area 42 is calculated on the basis of the function for interpolation. Further, a function which is generated by smoothing the resolution distribution image 52e, a function which is capable of obtaining the resolution distribution image 52e through least squares approximation, or the like may be used. In the same manner as described above, sharpness distribution images of the respective intersection points $A_1$ to $A_9$ are generated from the entire-area resolution distribution image 56, and thereby the image quality evaluation value is calculated.

As described above, the smaller the number of shots of photography performed on the test chart, the shorter the time period in which manufacturing of the imaging device 10 is completed. As a result, it is possible to reduce costs. In addition, an accuracy of the entire-area resolution distribution image 56, which is generated through a single shot of photography of the test chart, is lower than that of the entire-area resolution distribution image 53 which is generated through four shots of photography of the test chart. However, the number of shots of the photography of the test chart can be minimized, and thus manufacturing costs of the imaging device 10 are at the minimum.

If the entire-area resolution distribution image 56 is generated through the single shot of the photography of the test chart, the resolution distribution image 52e captured by photographing the test chart 51 at the intersection point $A_5$ is extrapolated. However, by extrapolating the resolution distribution image which is captured by photographing the test chart 51 at another intersection point, the entire-area resolution distribution image 56 may be generated. However, the accuracy is highest when the resolution distribution image 52e captured by photographing the test chart 51 at the intersection point $A_5$ is extrapolated.

The areas 54a to 54i corresponding to photography performed at the intersection points $A_1$ to $A_9$ are cut out from the entire-area resolution distribution images 53 and 56, and are used, whereby the image quality evaluation values of the intersection points $A_1$ to $A_9$ are generated (refer to FIG. 10). However, if the entire-area resolution distribution images 53 and 56 are generated, an area corresponding to an arbitrary intersection point other than the intersection points $A_1$ to $A_9$ is cut out and used, whereby an image quality evaluation value of an arbitrary intersection point can be generated. Hence, more specifically, data of the image quality evaluation values corresponding to the intersection points can be registered in the LUT 38. However, if the data of the LUT 38 is excessively large, it takes time to calculate a distance $R_n$ or a proportion $P_n$ and compare the proportion $P_n$. Therefore, it is not preferable that the number of pieces of the data registered in the LUT 38 is excessively large.

Hence, for example, regarding the intersection points registered in the LUT 38, only a predetermined number of intersection points having high image quality evaluation values may be registered in the LUT 38. Further, all intersection points, at which differences between own image quality evaluation values and the highest image quality evaluation value are equal to or less than a predetermined value (predetermined image quality evaluation value), may be registered. For example, only the intersection points, at which the differences from the highest image quality evaluation value are equal to or less than 10%, may be stored in the LUT 38, and only the intersection points, at which the differences are equal to or less than 5%, may be stored therein.

Figure 12:
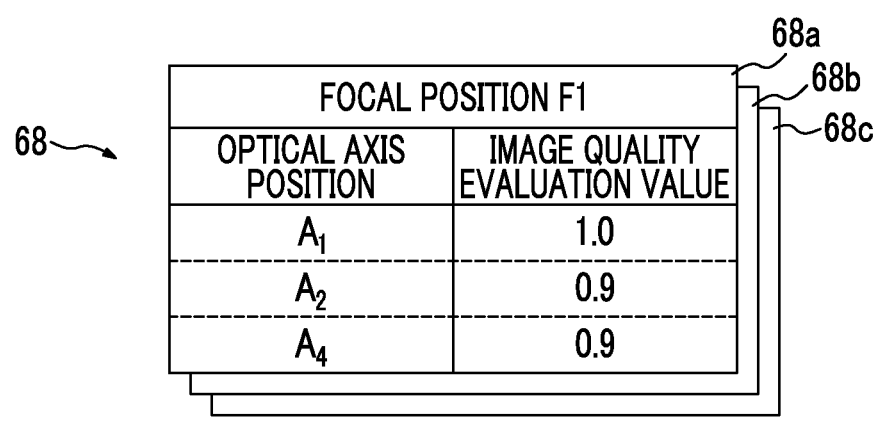
Figure 13:
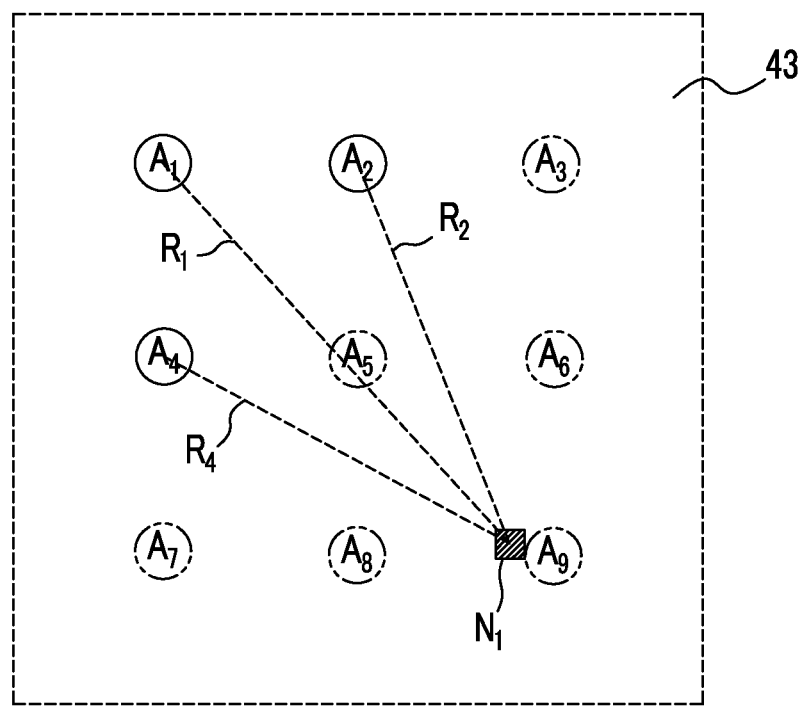
FIG. 13 is an explanatory diagram illustrating an operation in a case of using the LUT of FIG. 12.

This is the same for the case where a predetermined number of intersection points (for example intersection points $A_1$ to $A_9$) are registered in the LUT 38. For example, the LUT 68 of FIG. 12 is a LUT in which only data having image quality evaluation values within 10% from the maximum value (1.0) is selected from the LUT 38 of FIG. 4 and is registered. The first to third LUTs 68a to 68c respectively correspond to the focal positions F1, F2, and F3. In such a manner, for example, as shown in FIG. 13, distances, which are calculated to select the position of the intersection point for photography, are reduced to three of $R_1$, $R_2$, and $R_4$, and the calculated and compared proportions $P_n$ are also reduced to three of $P_1$, $P_2$, and $P_4$. Therefore, it is possible to select the position of the intersection point for photography faster.

For example, the intersection point at the time point of the input of the photography instruction may be at the position $N_1$ extremely close to the intersection point $A_9$ (refer to FIG. 13). In this case, if the intersection point $A_9$ and the corresponding image quality evaluation value are registered in the LUT, even though the image quality evaluation value corresponding to the intersection point $A_9$ is low (refer to FIG. 4), the distance $R_9$ is excessively short. Hence, the position of the intersection point $A_9$ is likely to be selected as the position of the intersection point for photography. As described above, when the position of the intersection point $A_9$ is selected as the position of the intersection point for photography, it is apparent that an effect of improving image quality is small. However, as described above, if the LUT 68 is used in which only data having image quality evaluation values within 10% from the maximum value (1.0) is selected and registered, candidates of the intersection points selected as the position of the intersection point for photography can be narrowed down to only the intersection points having high image quality evaluation values. Therefore, it is possible to reliably obtain an effect of improving image quality.

In addition, as the image quality evaluation value, a sharpness degree or a total sharpness degree is used, but the image quality evaluation value may be an arbitrary value which is a reference of image quality of the photographed image which can be obtained at each intersection point. For example, instead of the sharpness degree, a resolution may be used as the image quality evaluation value.

Instead of the sharpness degree, an average value (average luminance) of luminances of pixels of the test chart image may be used as the image quality evaluation value. As described above, when an average luminance is used as the image quality evaluation value, a value, which is obtained by weighting and averaging the luminances of the pixels of the test chart image in a manner similar to the case of using the sharpness degree as the image quality evaluation value, may be used. Further, a method of reducing the number of shots of the photography of the test chart image is the same for the case of using the sharpness degree as the image quality evaluation value.

A value, which is obtained by combining the above-mentioned values, may be used as the image quality evaluation value. For example, for each of the intersection points $A_1$ to $A_9$, a total sharpness degree and an average luminance are calculated, and a value, which is obtained by mixing those at an arbitrary ratio, may be used as the image quality evaluation value. For example, a total sharpness degree $G_1$ of the intersection point $A_1$ and an average luminance $H_1$ of the image, which is captured by photographing the test chart at the intersection point $A_1$, are calculated, and "$\alpha G_1 + \beta H_1$" ($\alpha$ and $\beta$ are arbitrary constants), in which those are added with $\alpha:\beta$, may be used as the image quality evaluation value.

The nine intersection points $A_1$ to $A_9$, which are arranged in a square lattice shape, are registered in the LUT 38, but if there are at least two or more intersection points registered in the LUT 38, the positions or arrangement thereof is arbitrary. The arrangement may be random. If two intersection points are selected in advance from the movable area 43 of the intersection point (refer to FIG. 3) and are registered in the LUT 38, it is preferable to select two intersection points dividing a segment, which passes through the center of the movable area 43 of the intersection points and passes through the centers of two vertical sides (sides which are in parallel with short sides of the image sensor 13) of the movable area 43 of the intersection points, into three equal parts. If three points are selected, it is preferable to select three points of $A_4$, $A_5$, and $A_6$ among the intersection points $A_1$ to $A_9$. However, three points of $A_2$, $A_5$, and $A_8$ may be selected, and three points of $A_7$, $A_5$, and $A_3$ may be selected. Otherwise, three arbitrary points may be selected.

The present invention also proposes a recording medium storing a control program for operations of the imaging device 10 including: the imaging lens 12; the image sensor 13; the lens moving mechanism 22; and the LUT 38.

If the shutter speed is slower than a predetermined shutter speed, the imaging device 10 performs hand shaking correction. However, instead of the hand shaking correction, the second lens 21b may be moved to cancel movement of the main subject by tracking the main subject. Detection of the main subject may be performed by, for example, the signal processing section 26.

The imaging lens 12 includes three lenses of the first to third lenses 21a to 21c, but the imaging lens 12 may be formed of a single lens or two lenses, and may be formed of four or more lenses. Further, the imaging lens 12 may include elements having substantially no power such as various optical filters and a cover glass. The imaging lens 12 may be a zoom lens of which a focal length is variable.

The second lens 21b is moved to perform hand shaking correction, but instead of moving the second lens 21b, the image sensor 13 may be moved in a direction perpendicular to the optical axis L1. Further, both the second lens 21b and the image sensor 13 may be movable in the direction perpendicular to the optical axis L1. As described above, in the case of moving the image sensor 13, there are provided a sensor moving mechanism for moving the image sensor 13 in the direction perpendicular to the optical axis L1 and a sensor position control section for controlling the position of the image sensor 13 through the sensor moving mechanism (both are not shown). Aspects of operations of the sensor moving mechanism and the sensor position control section are respectively similar to those of the lens moving mechanism 22 and the intersection point position control section 33. Further, in the case of providing both the lens moving mechanism 22 and the sensor moving mechanism, such two elements constitute the intersection point position control section 33.

The present invention can be applied to an arbitrary imaging device if it includes a correction lens which is movable perpendicular to the optical axis L1. For example, the present invention is appropriate for camera modules such as digital cameras, video cameras, and smartphones.

EXPLANATION OF REFERENCES

10: imaging device
12: imaging lens
13: image sensor
14: lens control unit
43: movable area of intersection point

What is claimed is:

1. An imaging device comprising:
    an imaging lens that forms an image of a subject;
    an image sensor that captures the image of the subject;
    a moving mechanism that moves a position of an intersection point between the image sensor and an optical axis of the imaging lens by moving at least either one of the image sensor or a lens included in the imaging lens in a plane which is perpendicular to the optical axis;
    a memory that stores image quality evaluation values respectively corresponding to positions of a plurality of the intersection points; and
    an intersection point position control section that acquires a position of the current intersection point, calculates distances between the position of the current intersection point and the positions of the plurality of the intersection points stored in the memory, selects the position of the intersection point, at which a ratio of the image quality evaluation value to the distance from the current intersection point is at the maximum, as a position of an intersection point for imaging, among the positions of the plurality of the intersection points stored in the memory, and causes the moving mechanism to move a position of the current intersection point to the position of the intersection point for imaging.

2. The imaging device according to claim 1, wherein the image quality evaluation value is a value based on a sharpness degree of the image.

3. The imaging device according to claim 2, wherein the image quality evaluation value is a value based on an average luminance of the image and the sharpness degree of the image.

4. The imaging device according to claim 3, wherein the memory stores only the image quality evaluation values and the positions of the intersection points, at which the image quality evaluation values are higher than a predetermined image quality evaluation value, among the plurality of the image quality evaluation values which are respectively measured at the positions of the plurality of the intersection points.

5. The imaging device according to claim 3, further comprising:
    a focus adjustment mechanism that moves a focal position of the imaging lens by moving the lens included in the imaging lens along the optical axis so as to perform focusing; and
    a focal position control section that controls the focal position through the focus adjustment mechanism,
    wherein the memory stores the image quality evaluation value for each focal position in advance, and
    wherein the intersection point position control section selects the position of the intersection point for imaging with reference to the image quality evaluation value corresponding to the focal position determined by the focal position control section.

6. The imaging device according to claim 2, wherein the memory stores only the image quality evaluation values and the positions of the intersection points, at which the image quality evaluation values are higher than a predetermined image quality evaluation value, among the plurality of the image quality evaluation values which are respectively measured at the positions of the plurality of the intersection points.

7. The imaging device according to claim 2, further comprising:
    a focus adjustment mechanism that moves a focal position of the imaging lens by moving the lens included in the imaging lens along the optical axis so as to perform focusing; and
    a focal position control section that controls the focal position through the focus adjustment mechanism,
    wherein the memory stores the image quality evaluation value for each focal position in advance, and
    wherein the intersection point position control section selects the position of the intersection point for imaging with reference to the image quality evaluation value corresponding to the focal position determined by the focal position control section.

8. The imaging device according to claim 2, wherein the image quality evaluation values are calculated on the basis of resolutions of test chart images which are obtained by capturing images of a test chart while changing the position of the intersection point.

9. The imaging device according to claim 1, wherein the memory stores only the image quality evaluation values and the positions of the intersection points, at which the image quality evaluation values are higher than a predetermined image quality evaluation value, among the plurality of the image quality evaluation values which are respectively measured at the positions of the plurality of the intersection points.

10. The imaging device according to claim 9, further comprising:

a focus adjustment mechanism that moves a focal position of the imaging lens by moving the lens included in the imaging lens along the optical axis so as to perform focusing; and a focal position control section that controls the focal position through the focus adjustment mechanism, wherein the memory stores the image quality evaluation value for each focal position in advance, and wherein the intersection point position control section selects the position of the intersection point for imaging with reference to the image quality evaluation value corresponding to the focal position determined by the focal position control section.

11. The imaging device according to claim 1, further comprising:

a focus adjustment mechanism that moves a focal position of the imaging lens by moving the lens included in the imaging lens along the optical axis so as to perform focusing; and a focal position control section that controls the focal position through the focus adjustment mechanism, wherein the memory stores the image quality evaluation value for each focal position in advance, and wherein the intersection point position control section selects the position of the intersection point for imaging with reference to the image quality evaluation value corresponding to the focal position determined by the focal position control section.

12. The imaging device according to claim 1, wherein the image sensor captures an image of the subject at a shutter speed which is preset in accordance with the subject, and wherein the intersection point position control section acquires the shutter speed which is preset in accordance with the subject, compares the shutter speed with a predetermined shutter speed as a threshold value, and moves the position of the current intersection point to the position of the intersection point for imaging if the set shutter speed is equal to or less than the predetermined shutter speed.

13. The imaging device according to claim 12, wherein assuming that a 35 mm equivalent focal length of the imaging lens is f mm, the predetermined shutter speed is equal to or less than 1/f seconds.

14. The imaging device according to claim 13, further comprising a hand shaking detection section that detects hand shaking, wherein if the shutter speed is slower than the predetermined shutter speed, the intersection point position control section corrects the hand shaking by moving the position of the intersection point in accordance with the hand shaking.

15. The imaging device according to claim 13, further comprising a subject movement detection section that detects movement of the subject, wherein if the shutter speed is slower than the predetermined shutter speed, the intersection point position control section controls the position of the intersection point so as to cancel the movement of the subject.

16. The imaging device according to claim 12, further comprising a hand shaking detection section that detects hand shaking, wherein if the shutter speed is slower than the predetermined shutter speed, the intersection point position control section corrects the hand shaking by moving the position of the intersection point in accordance with the hand shaking.

17. The imaging device according to claim 12, further comprising a subject movement detection section that detects movement of the subject, wherein if the shutter speed is slower than the predetermined shutter speed, the intersection point position control section controls the position of the intersection point so as to cancel the movement of the subject.

18. The imaging device according to claim 1, wherein the image quality evaluation values are calculated on the basis of resolutions of test chart images which are obtained by capturing images of a test chart while changing the position of the intersection point.

19. A method of driving an imaging device using the imaging device according to claim 1 in which at least either one of a lens included in an imaging lens forming an image of a subject or an image sensor capturing the image of the subject is movable in a plane which is perpendicular to an optical axis of the imaging lens, the method comprising:

an intersection point acquisition step of acquiring a position of a current intersection point between the image sensor and the optical axis;

an intersection-point-for-imaging selection step of referring to the memory in which image quality evaluation values respectively corresponding to positions of a plurality of the intersection points are stored in advance, calculating distances between the position of the current intersection point and the positions of the respective intersection points stored in the memory, and selecting a position of an intersection point for imaging, at which a ratio of the image quality evaluation value to the distance from the position of the current intersection point is at the maximum, among the positions of the plurality of the intersection points stored in the memory;

an intersection point movement step of moving the position of the current intersection point to the position of the intersection point for imaging; and an imaging step of capturing an image of the subject in a state where the position of the intersection point is set at the position of the intersection point for photography.

20. A recording medium storing computer-readable non-transitory program for controlling the imaging device according to claim 1 including an imaging lens that forms an image of a subject, an image sensor that captures the image of the subject, a moving mechanism that moves an intersection point between the image sensor and an optical axis of the imaging lens by moving at least either one of the image sensor or a lens included in the imaging lens in a plane which is perpendicular to the optical axis, and a memory that stores image quality evaluation values respectively corresponding to positions of a plurality of the different intersection points in advance, the program causing a control section of the imaging device to execute:

an intersection point acquisition step of acquiring the current intersection point;

an intersection-point-for-imaging selection step of referring to the memory, calculating distances between the position of the current intersection point and the positions of the respective intersection points stored in the memory, and selecting a position of an intersection point for imaging, at which a ratio of the image quality evaluation value to the distance from the current intersection point is at the maximum, among the positions of the plurality of the intersection points stored in the memory;

an intersection point movement step of causing the moving mechanism to move the current intersection point to the position of the intersection point for imaging; and an imaging step of causing the image sensor to capture an image of the subject in a state where the position of the intersection point is set at the position of the intersection point for photography.

* * * * *